United States Patent
Li

(10) Patent No.: US 6,181,645 B1
(45) Date of Patent: Jan. 30, 2001

(54) ULTRASOUND SENSOR FOR DISTANCE MEASUREMENT

(76) Inventor: Shih-Hsiung Li, 8th Fl.-1, No. 23, Sec.1, Hangchow S. Rd., Taipei (TW)

(*) Notice: Under 35 U.S.C. 154(b), the term of this patent shall be extended for 0 days.

(21) Appl. No.: 09/270,491

(22) Filed: Mar. 15, 1999

(30) Foreign Application Priority Data

Mar. 26, 1998 (TW) .................................. 87204467

(51) Int. Cl.[7] ........................... G01S 7/521; G01S 15/93; B60R 21/00; H04R 17/00
(52) U.S. Cl. ........................... 367/178; 367/140; 310/334
(58) Field of Search .................................. 310/322, 324, 310/334, 335; 367/140, 178, 188; 73/649

(56) References Cited

U.S. PATENT DOCUMENTS

| | | | |
|---|---|---|---|
| 4,437,032 | * 3/1984 | Gelhard | 310/324 |
| 4,500,977 | * 2/1985 | Gelhard | 367/108 |
| 5,446,332 | * 8/1995 | Rapps et al. | 310/324 |
| 5,600,610 | * 2/1997 | Hill et al. | 367/181 |

* cited by examiner

*Primary Examiner*—Ian J. Lobo
(74) *Attorney, Agent, or Firm*—Dellett and Walters

(57) ABSTRACT

An ultrasound sensor for distance measurement is disclosed. The ultrasound sensor has a housing, a ceramic buzzer, a plurality of isolators both received in the housing and a C ring for securing the plurality of isolators in the housing. The housing has an elliptical and a circular compartments defined therein. The elliptical compartment communicates with the circular compartment and both have a unique shape, which is able to limit the shape of the emitted signal by the ceramic buzzer. The limited range of the emitted signal by the ceramic buzzer covers the entire cross section of the vehicle and will not cause a false alarm by reflection from the ground.

8 Claims, 6 Drawing Sheets

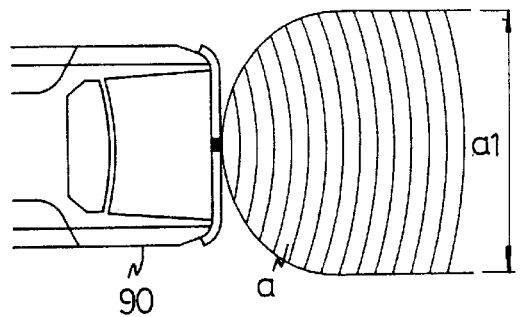
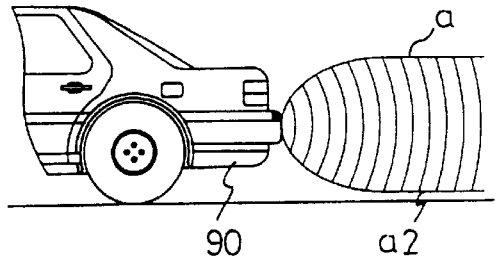
FIG. 5-A     FIG. 5-B
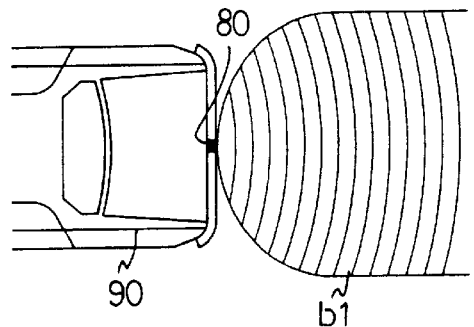
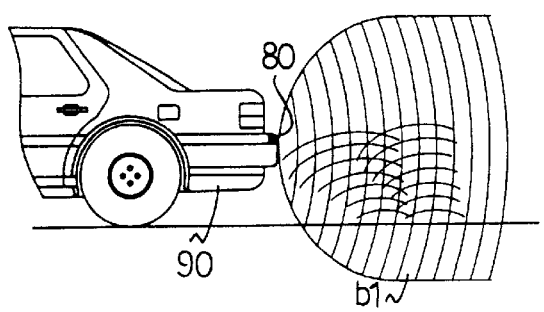
FIG. 10-A
PRIOR ART
FIG. 10-B
PRIOR ART
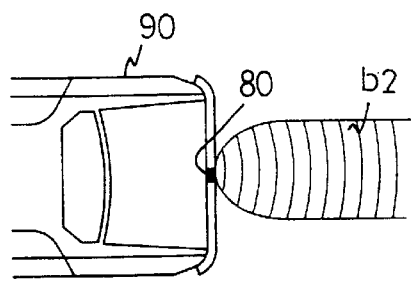
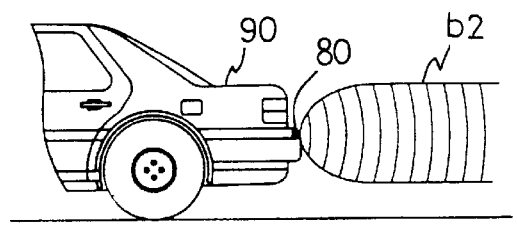
FIG. 11-A
PRIOR ART
FIG. 11-B
PRIOR ART

ULTRASOUND SENSOR FOR DISTANCE MEASUREMENT

BACKGROUND OF THE INVENTION

1. Field of the Invention

The present invention relates to an ultrasound sensor used to measure distance, and more particularly to a sensor for determining and indicating distances between vehicles and obstacles at close range with ultrasound techniques. The sensor has a unique shape that covers the entire width of the vehicle without being falsely activated by the reflected ground signal.

2. Description of Related Art

Distance measurement by ultrasound is very helpful for metropolitan drivers. Confined by limited parking spaces, most drivers have to depend on their skills to squeeze into a parking space. However, when backing or parking vehicles, drivers normally have blind spots, which can cause serious consequences. Therefore, an ultrasound sensor for detecting the distance to an object was introduced to the market for drivers to eliminat the dangers of the existence of blind spots. Related information about the ultrasound sensor can be seen in U.S. Pat. No. 4,500,977, issued to Gelhard on Feb. 19, 1985 and U.S. Pat. No. 4,437,032 also issued to Gelhard on Mar. 13, 1984. A conventional ultrasound sensor (80) used in vehicles for sounding an alarm when approaching obstacles usually is mounted at the center of a vehicle (90), as shown in FIG. 9. It is well known in the art that the sensitivity of the sensor (80) is adjustable and the shape of the emitted signal by the sensor (80) is circular. Therefore, for the purpose of covering the entire cross sectional area of the vehicle (80), the diameter of the emitted beam by the sensor (80) is adjusted to be b1, as shown in FIG. 10-A. However, when the ultrasound sensor (80) mounted on the vehicle (90) is activated, a portion of the signal will be reflected by the ground, which will initiate a false alarm informing the driver that the vehicle (90) is approaching a potential obstacle, as shown in FIG. 8-B. To eliminate the possibility of the activation of a false alarm, the sensitivity of the sensor (80) is adjusted to have a diameter b2 which is smaller than b1, as shown in FIG. 11-A. With such a beam diameter, the vehicle (90) is able to detect the distance from an obstacle effectively. However, both sides of the vehicle (90) become blind spots for the driver, due to the reduced diameter of the emitted beam by the sensor (80), as shown in FIG. 11-B.

It is notable from the above description that the conventional ultrasound sensor is not appropriate and thus an improvement to the ultrasound sensor is necessary.

To overcome the aforementioned problems, the invention provides an improved ultrasound sensor having a unique shape that is able to emit signal covering the entire cross sectional area of the vehicle without initiating a false alarm.

The present invention tends to provide an improved ultrasound sensor to obviate and/or mitigate the aforementioned problems.

SUMMARY OF THE INVENTION

The primary objective of the present invention is to provide an ultrasound sensor having a unique shape to eliminate the possibility of activating a false alarm and to effectively alert the driver that the vehicle is approaching an obstacle.

According to one aspect of the invention, the ultrasound sensor of the invention has an aluminum housing defining therein a elliptical compartment and a circular compartment communicating with the elliptical compartment, a ceramic buzzer received in the elliptical compartment, a plurality of isolators received in the elliptical compartment on top of the ceramic buzzer and a layer of silicone rubber received in the circular compartment on top of the plurality of isolators, wherein the elliptical compartment is elliptical so that the shape of the emitted signal beam is limited by the elliptical configuration of the elliptical compartment, whereby allowing the emitted signal beam to have a width covering the entire width of the vehicle and a height covering the vertical excursion of the vehicle.

Another objective of the invention is to provide a housing having a sectoral configuration which is able to accomplish the aforementioned purpose.

Further objectives and advantages of the present invention will become apparent from a careful reading of the detailed description provided hereinafter, with appropriate reference to the accompanying drawings.

BRIEF DESCRIPTION OF THE DRAWINGS

FIGS. 5-A and 5-B show the effectiveness of the change of the configuration of the ultrasound sensor;

FIGS. 10-A and 10-B show the effectiveness of the conventional ultrasound sensor; and FIGS. 11-A and 11-B show the adjusted working area of the conventional ultrasound sensor.

DETAILED DESCRIPTION OF THE PREFERRED EMBODIMENTS

Figure 1:
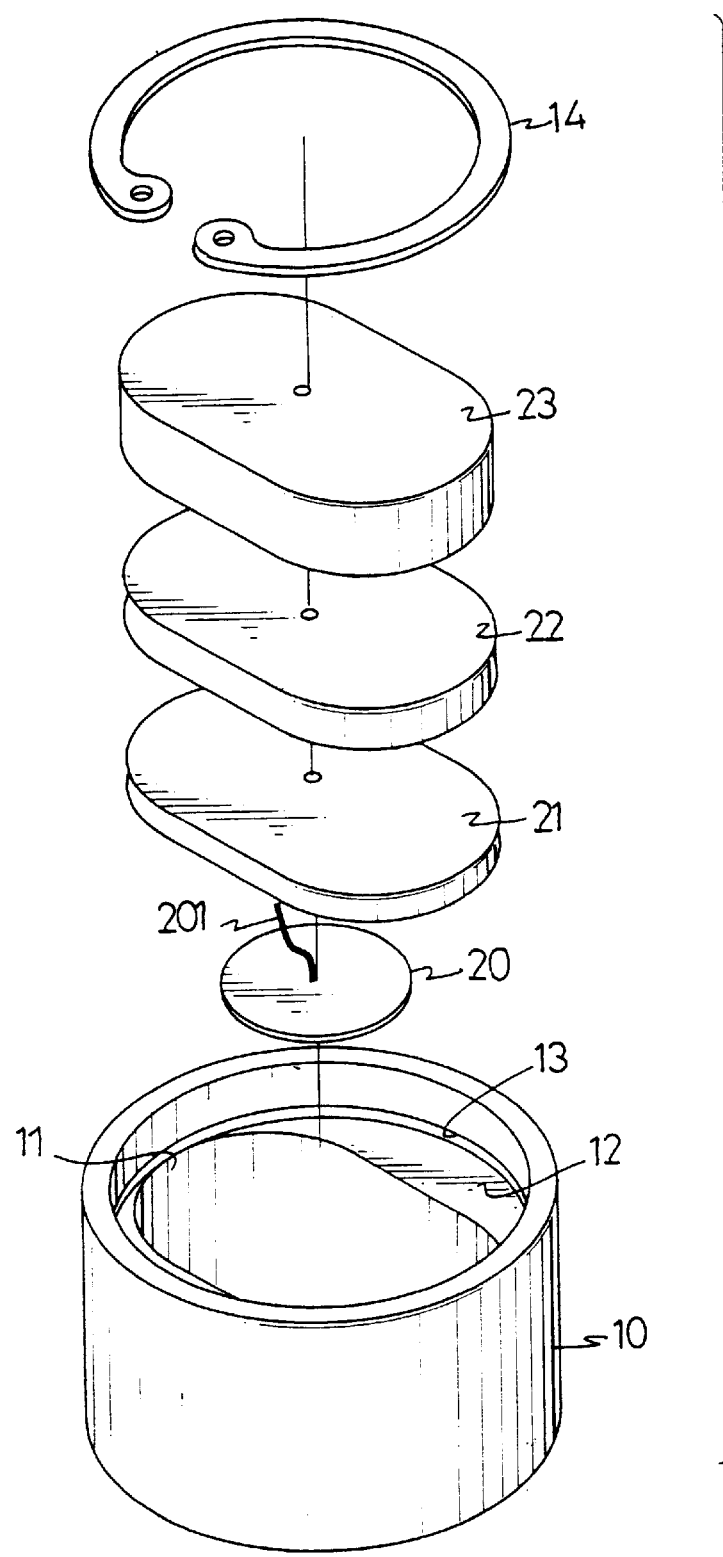
FIG. 1 is an exploded perspective view showing the elements of the invention.
Figure 2:
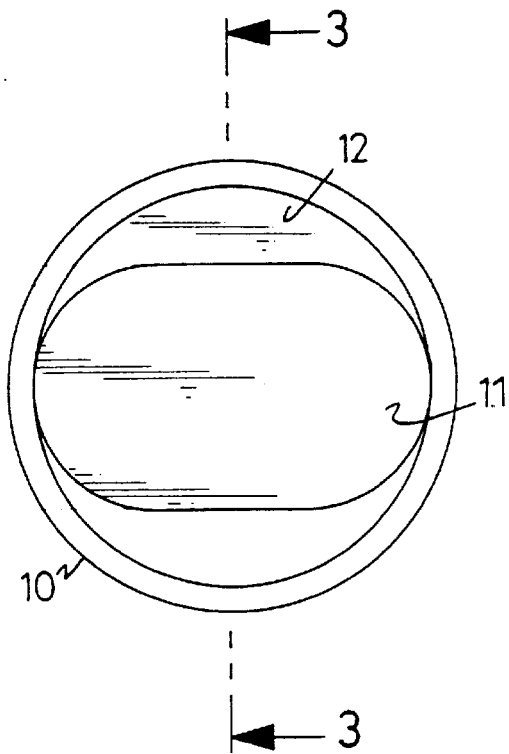
FIG. 2 is a front plan view showing the elliptical interior of the housing of the invention.

FIG. 1 shows an ultrasound sensor constructed in accordance with the invention. The ultrasound sensor in accordance with the invention has a housing (10), preferably made of aluminum, defining therein an elliptical compartment (11), a circular compartment (12) communicating with the elliptical compartment (11), an annular groove (13) defined at the joint of the elliptical and the circular compartments (11, 12), a ceramic buzzer (20) received in the elliptical compartment (11), a plurality of isolators (21, 22, 23) received in the elliptical compartment (11) on top of the ceramic buzzer (20) and a C ring (14) detachably received in the annular groove (13) for securing the plurality of isolators (21, 22, 23) in the elliptical compartment (11). The housing (10) has an elliptical shape defined therein, which means that the width Y1-Y2 is greater than the height X1-X2 thereof as shown in FIG. 2. Furthermore, the ceramic buzzer (20) functions as an ultrasound transceiver so as to transmit and receive ultrasound signals.

Figure 3:
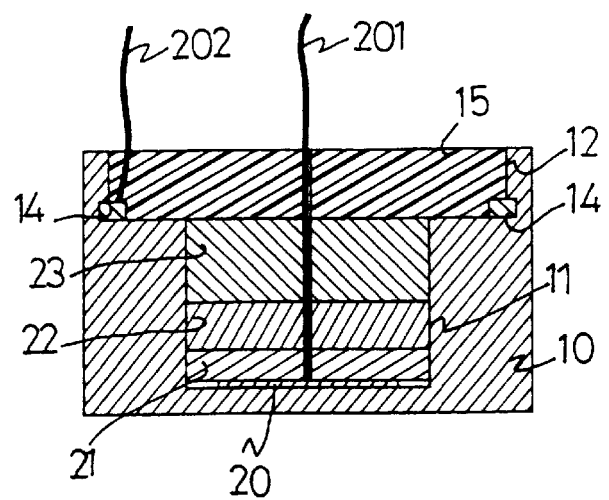
FIG. 3 is a side cross sectional view of the assembled invention.

When in assembly, referring to FIG. 3, all the elements of the ultrasound sensor of the invention as shown in FIG. 1 are received in the elliptical compartment (11). Then, a layer of silicone rubber (15) fills the circular compartment (12) to seal the circular compartment (12). The anode of the ceramic buzzer element is provided with a elliptical wire (201) penetrating through the plurality of isolators (21, 22, 23) and extending outward therefrom and the cathode connects with the bottom of the elliptical compartment (11) and is provided with a circular wire (202) connected to the C ring (14). Preferably, the plurality of isolators (21, 22, 23) are a silicone rubber plate for thermal isolation, and felt and cork for sound isolation.

Figure 4:
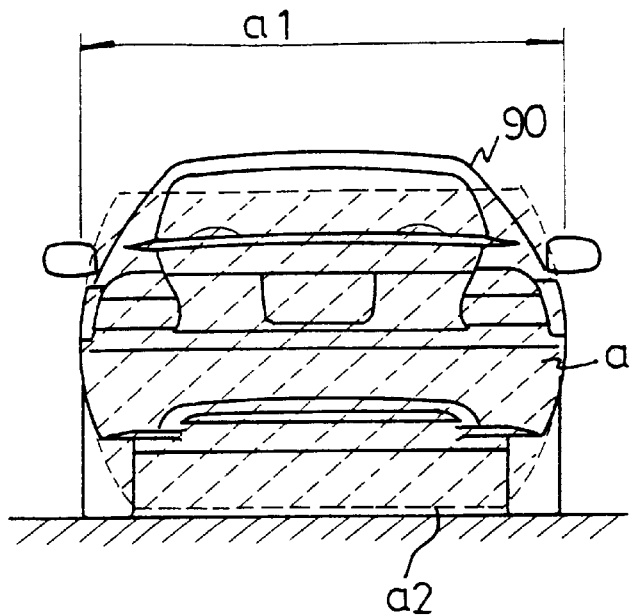
FIG. 4 is a schematic view showing the working area of the ultrasound sensor of the invention.
Figure 9:
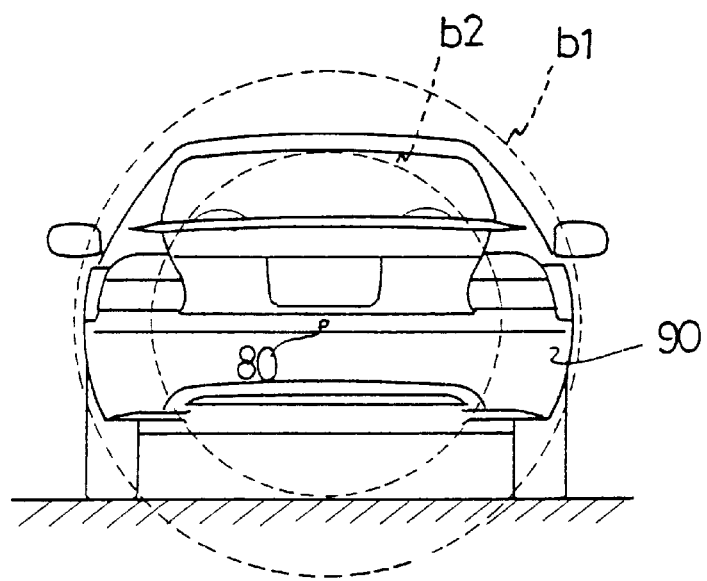
FIG. 9 is a schematic view showing the working cross section of a conventional ultrasound sensor.

Referring to FIG. 4, the working cross section of the ultrasound sensor of the invention is changed due to the elliptical shape of the elliptical compartment (11) and the circular compartment (12). Due to the confinement of the elliptical shape of the compartment (11), the beam cross section of the ultrasound sensor has a width (a1) greater than the width of the vehicle (90), as shown in FIG. 5-A, and the bottom of the beam (a2) is above the ground, as shown in FIG. 5-B.

Figure 6:
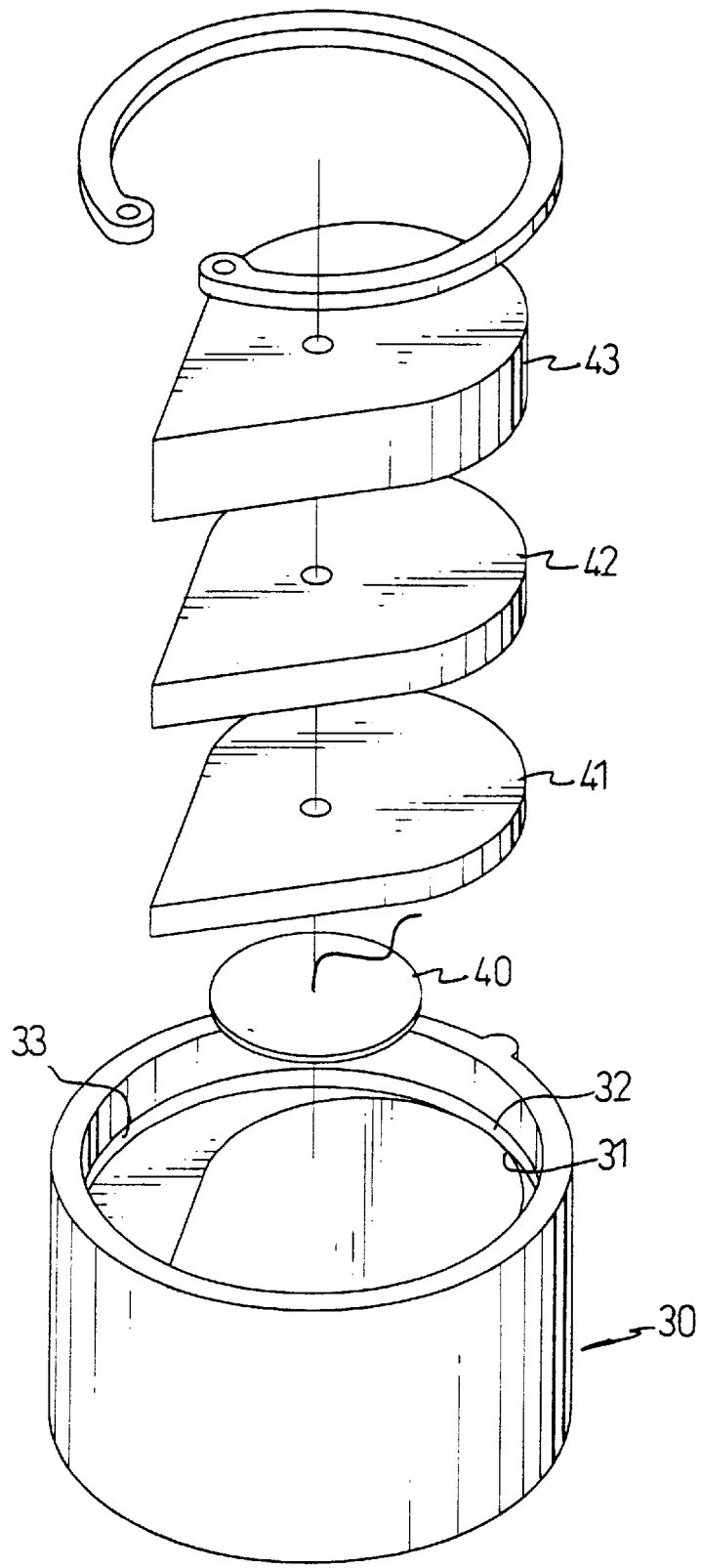
FIG. 6 is an exploded perspective view showing the elements of another preferred embodiment of the ultrasound sensor having a sectoral shape defined therein.

Furthermore, referring to FIG. 6, an ultrasound sensor (30) having a sectoral shape is presented. The ultrasound sensor has a sectoral compartment. The ultrasound sensor can accomplish the same purpose as discussed above.

Figure 7:
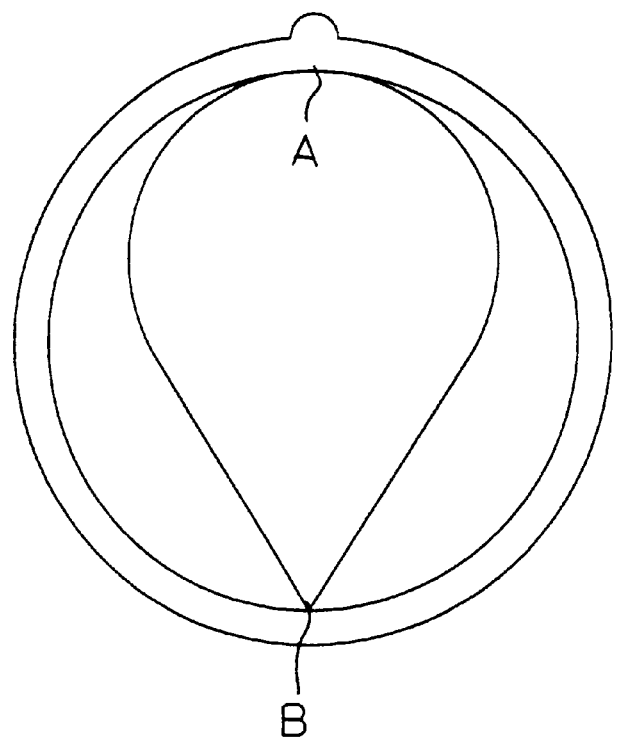
FIG. 7 is a top plan view showing the sectoral interior of the housing of the invention shown in FIG. 6.

Detailed description thereof is as follows:

With reference to FIG. 6, another preferred embodiment of the ultrasound sensor is constructed in accordance with the invention. The ultrasound sensor in accordance with the invention has a housing (30), preferably made of aluminum, defining therein a sectoral compartment (31), a circular compartment (32) communicating with the sectoral compartment (31), an annular groove (33) defined at the joint of the sectoral and the circular compartments (31, 32), a ceramic buzzer (40) received in the sectoral compartment (31), a plurality of isolators (41, 42, 43) received in the sectoral compartment (31) on top of the ceramic buzzer (40) and a C ring (14) detachably received in the annular groove (33) for securing the plurality of isolators (41, 42, 43) in the sectoral compartment (31). The housing (30) has a sectoral shape defined therein, which means that the sectoral compartment (31) is defined from an end face defining the circular compartment (32) with a mark of A and ended at opposed end face with a mark of B in a tapered manner as shown in FIG. 7. Furthermore, the ceramic buzzer (40) functions as an ultrasound transceiver so as to transmit and receive ultrasound signals.

Figure 8:
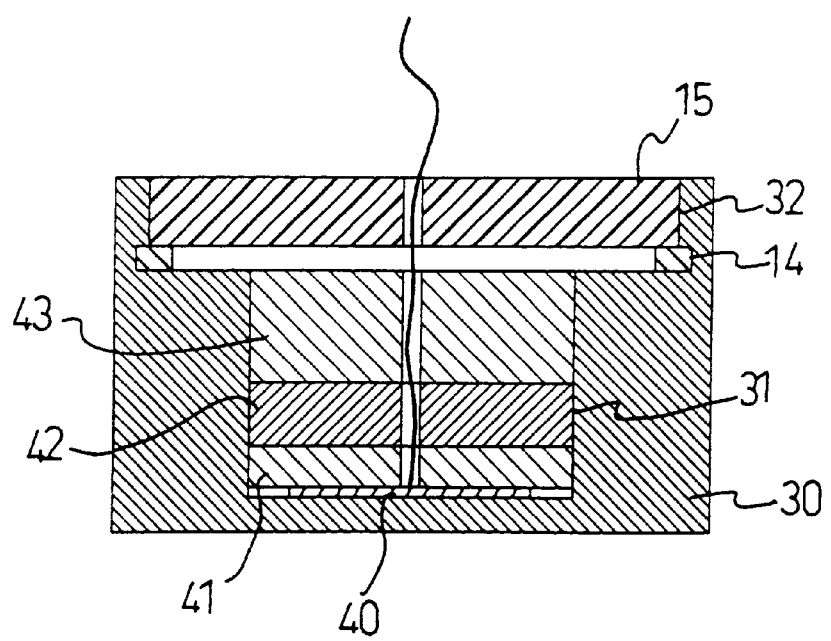
FIG. 8 is a side cross sectional view of the assembled invention shown in FIG. 6.

When in assembly, referring to FIG. 8, all the elements of the ultrasound sensor of the invention as shown in FIG. 6 are received in the sectoral compartment (31). Then, a layer of silicone rubber (15) fills the circular compartment (32) to seal the circular compartment (32). The anode of the ceramic buzzer element is provided with an elliptical wire (401) penetrating through the plurality of isolators (41, 42, 43) and extending outward therefrom and the cathode connects with the bottom of the sectoral compartment (31) and is provided with a circular wire (402) connected to the C ring (14). Preferably, the respective one of the plurality of isolators (41, 42, 43) are a silicone rubber plate for thermal isolation, and felt and cork for sound isolation.

Referring to FIG. 4, the working cross section of the ultrasound sensor of the invention is changed due to the sectoral shape of the sectoral compartment (31) and the circular compartment (32). Due to the confinement of the sectoral shape of the compartment (31), the beam cross section of the ultrasound sensor has a width (a1) greater than the width of the vehicle (90), as shown in FIG. 5-A and the bottom of the beam (a2) is above the ground as shown in FIG. 5-B.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. It should also be noted that those skilled in the art are able to make amendment, alterations and changes according to the detailed description of the preferred embodiment. However, those alternations, changes and or amendments should also be included in the principle of the invention and claimed in the appended claims.

What is claimed is:

1. An ultrasound sensor for distance measurement comprising:

a housing (10) defining therein an elliptical compartment (11) and a circular compartment (12) communicating with the elliptical compartment (11);

a ceramic buzzer (20) received in the elliptical compartment (11) and having a elliptical wire (201) extending from the anode and a circular wire (202) extending from the cathode thereof;

a plurality of isolators (21, 22, 23) received in the elliptical compartment (11) on top of the ceramic buzzer (20); and a C ring (14) detachably received in the circular compartment (12) for securing the plurality of isolators (21, 22, 23) in the elliptical compartment (11) and connected with the circular wire (202).

2. The ultrasound sensor as claimed in claim 1, wherein an annular groove (13) is defined at the joint of the elliptical compartment (11) and the circular compartment (12) to receive the C ring (14) therein.

3. The ultrasound sensor as claimed in claim 2, wherein the plurality of isolators (21, 22, 23) are a silicone rubber plate, felt and cork respectively.

4. The ultrasound sensor as claimed in claim 3, wherein a silicone rubber layer (15) fills in the circular compartment (12) to seal the housing (10).

5. An ultrasound sensor for distance measurement comprising:

a housing (30) defining therein a sectoral compartment (31);

a ceramic buzzer (20) received in the sectoral compartment (31) and having a elliptical wire (201) extending from the anode and a circular wire (202) extending from the cathode thereof;

a plurality of isolators (21, 22, 23) received in the sectoral compartment (31) on top of the ceramic buzzer (20); and a C ring (14) detachably received in the sectoral compartment (31) for securing the plurality of isolators (21, 22, 23) in the sectoral compartment (31) and connected with the circular wire (202).

6. The ultrasound sensor as claimed in claim 5, wherein an annular groove (13) is defined in the sectoral compartment (31) to receive the C ring (14) therein.

7. The ultrasound sensor as claimed in claim 6, wherein the plurality of isolators (21,22,23) are silicone rubber plate, felt and cork respectively.

8. The ultrasound sensor as claimed in claim 7, wherein a layer of silicone rubber layer (15) is filled in the sectorial compartment (31) to seal the housing (10).

\* \* \* \* \*